May 2, 1933.                    E. C. BIXBY                    1,906,444
                            CANDLE MAKING MACHINE
                        Filed June 2, 1932          7 Sheets-Sheet 1
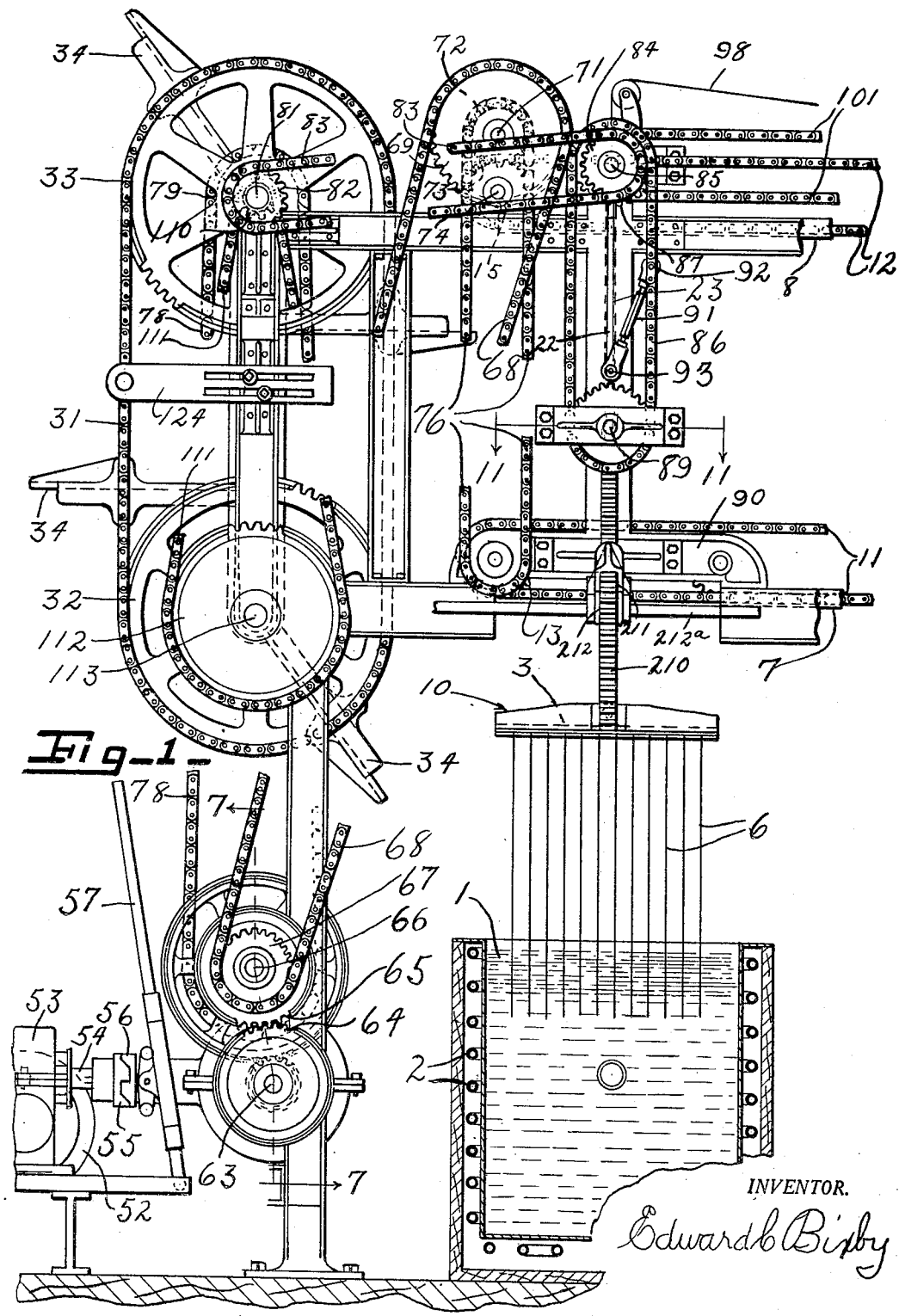
INVENTOR.
Edward C Bixby

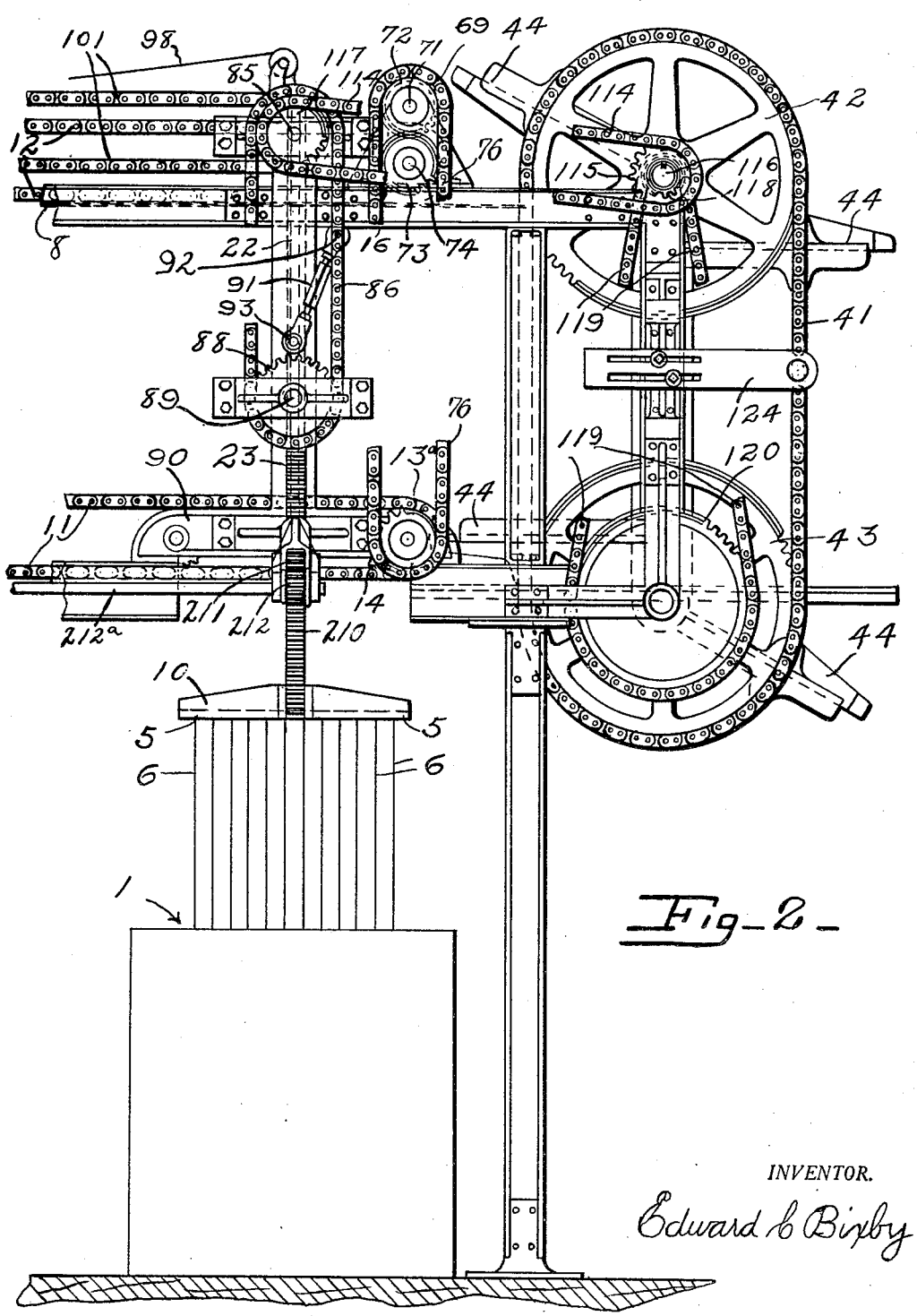

May 2, 1933. E. C. BIXBY 1,906,444
CANDLE MAKING MACHINE
Filed June 2, 1932 7 Sheets-Sheet 3
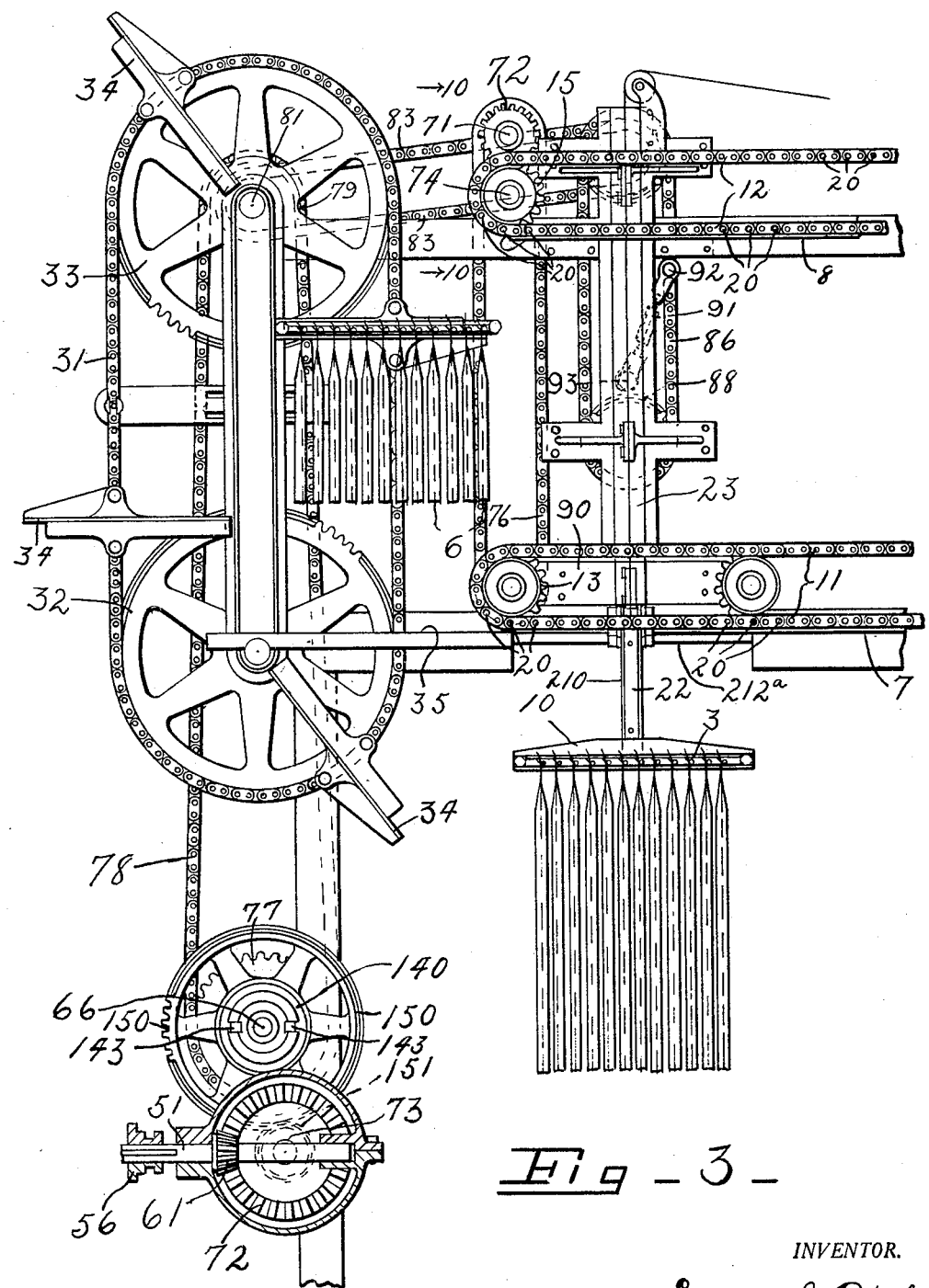
Fig-3-
INVENTOR.
Edward C Bixby

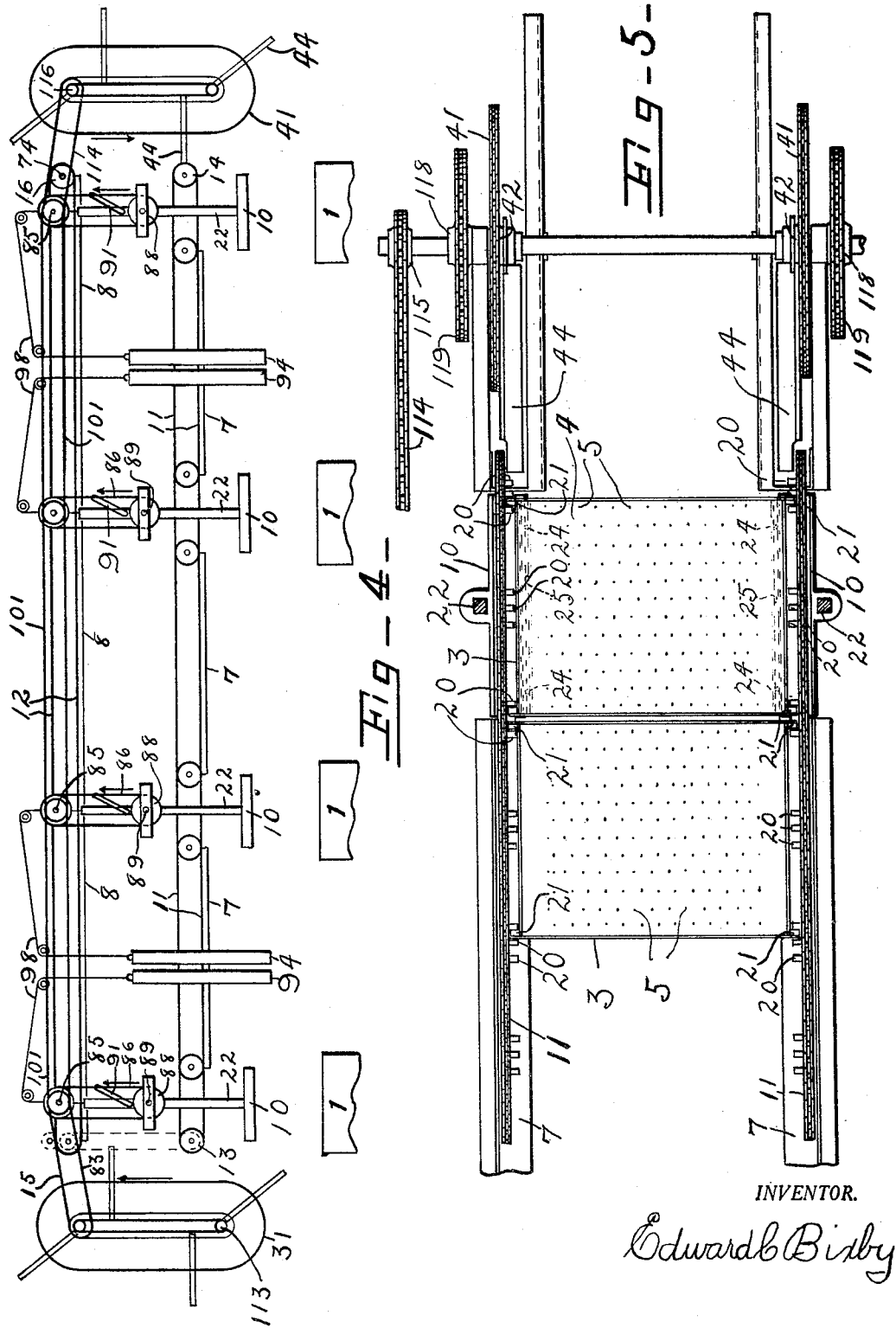

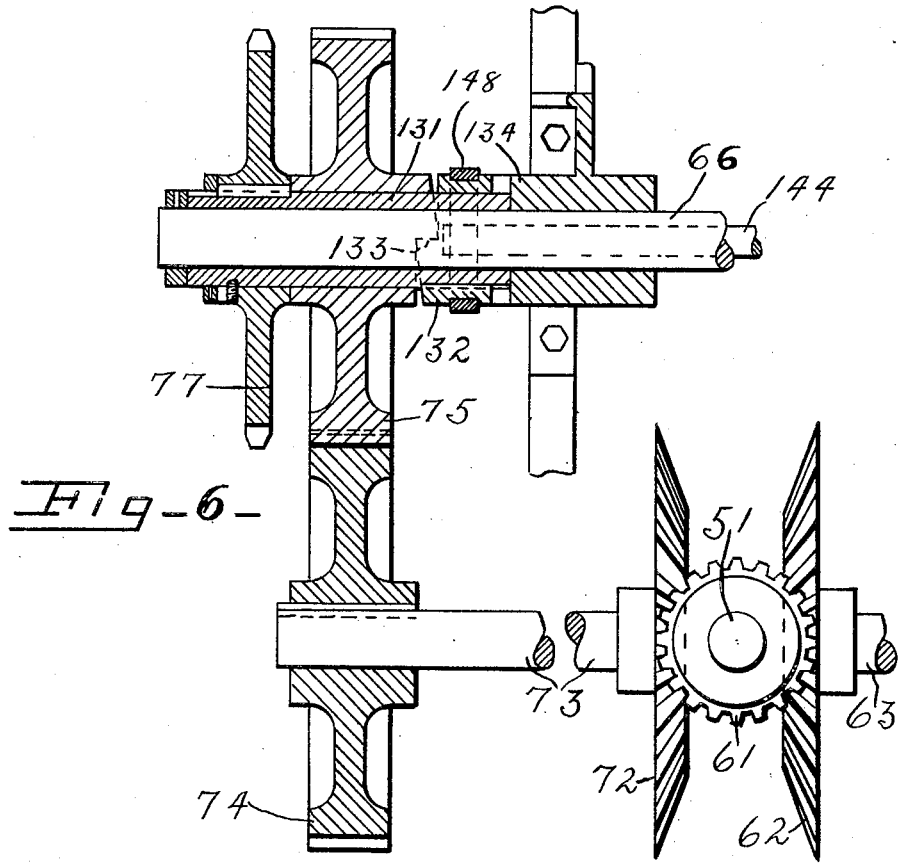
Fig-6-
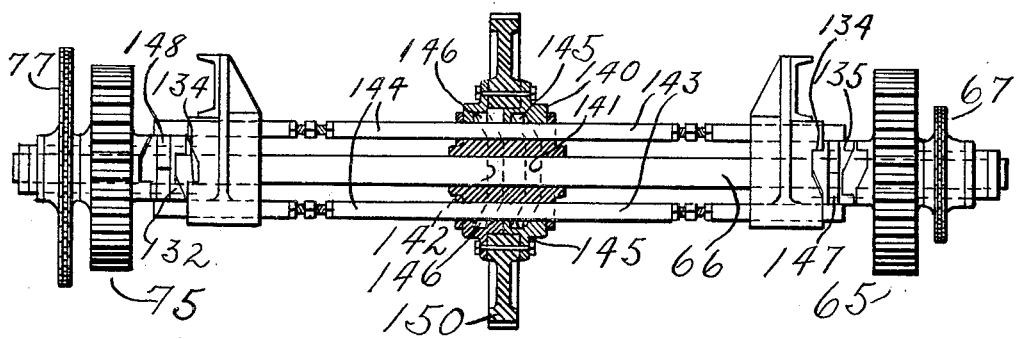
Fig-7-
INVENTOR.
Edward C Bixby

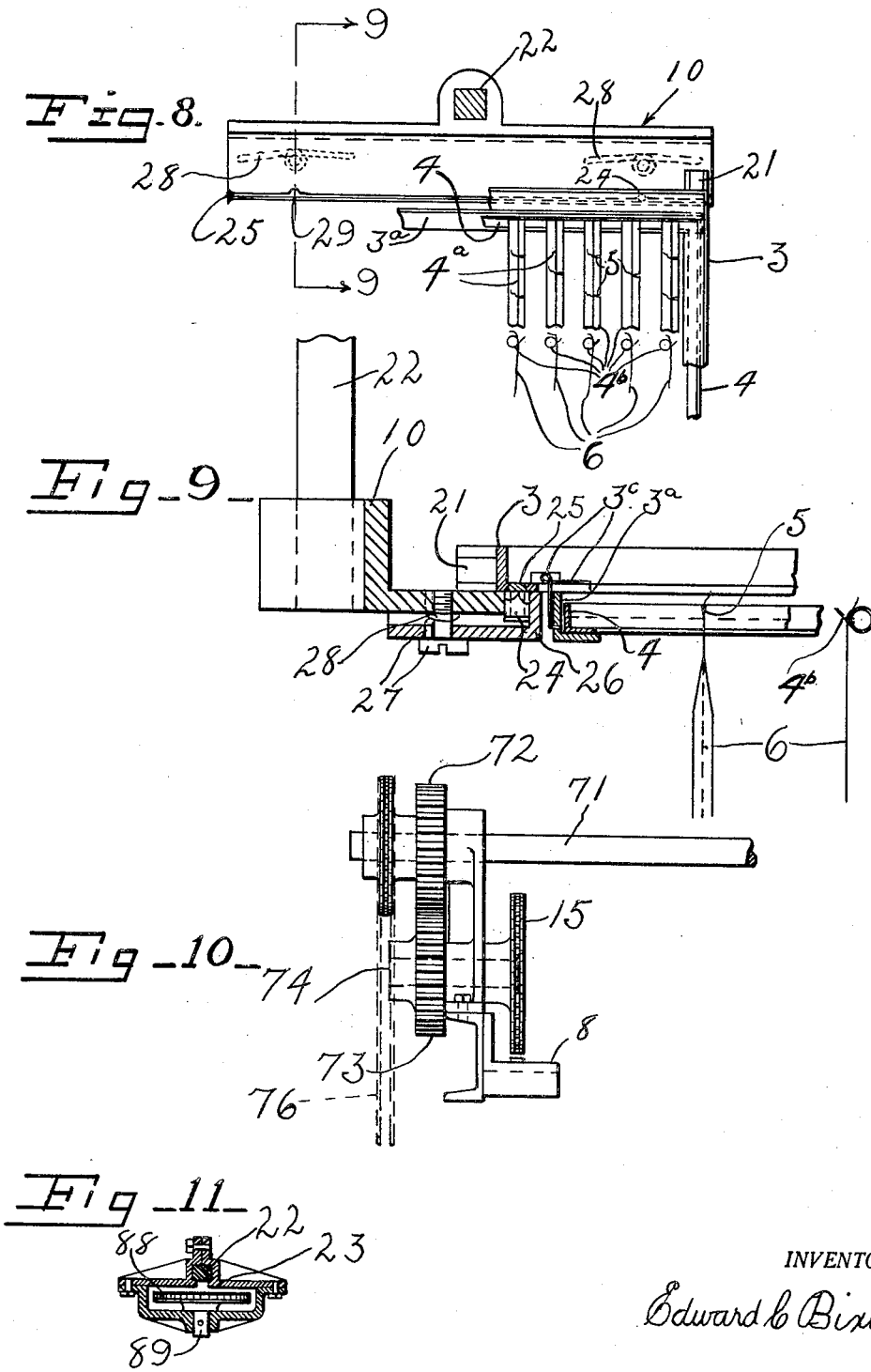

INVENTOR.
Edward C. Bixby

Patented May 2, 1933

1,906,444

UNITED STATES PATENT OFFICE

EDWARD C. BIXBY, OF SALINA, NEW YORK

CANDLE MAKING MACHINE

Application filed June 2, 1932. Serial No. 614,981.

This invention relates to candle dipping or making machines, and has for its object a power actuated machine by which the candle wicks and partly formed candles are automatically carried to the vat containing wax, grease, or other candle material, and dipped and permitted to cool while other wicks or partly formed candles are being dipped, and the operations automatically repeated until the candles are built up to the required size. Also a machine by which the dipping operations on a plurality of different sets or batches of wicks or candles takes place at the same time with sufficient cooling periods between them, whereby there is a minimum loss of time consumed in the dipping and cooling operations, and also a machine by which a batch of candle wicks can be inserted and the finished candles removed at several stations.

Other objects appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a fragmentary side elevation of the end portion of the machine at which the drive shaft is located.

Figure 2 is a similar view of the opposite end portion of the machine at which the loading station is located.

Figure 3 is a sectional view of the end portion of the machine shown in Figure 1, the section being taken on the central vertical plane.

Figure 4 is a schematic view and side elevation.

Figure 5 is a fragmentary plan view, parts being removed of the mechanism shown in Figure 2.

Figure 6 is an enlarged fragmentary sectional view of the motion transmitting mechanism.

Figure 7 is an enlarged sectional view on line 7—7, Figure 1.

Figure 8 is an enlarged view of one of the dippers, a portion of the tray or holder for the wicks being also shown.

Figure 9 is an enlarged sectional view taken on line 9—9, Figure 8.

Figure 10 is a fragmentary sectional view taken on line 10—10, Figure 3, parts being removed.

Figure 11 is a detail sectional view taken on line 11—11, Figure 1.

Figure 12:
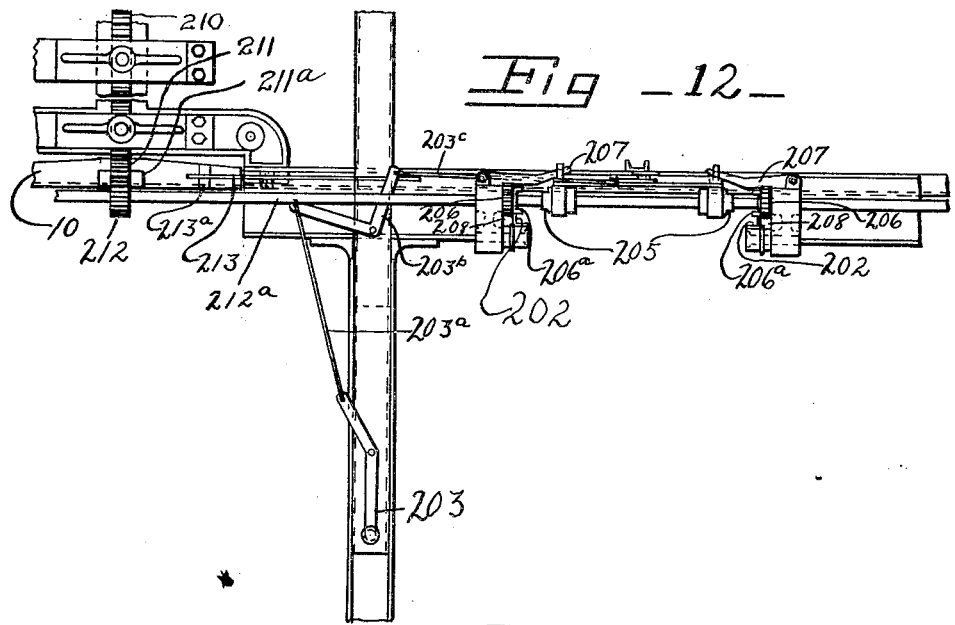
Figure 12 is a fragmentary side elevation showing unloading mechanism.

Heretofore in manufacturing candles they have been dipped by means of a hand operated machine consisting of a single vat, a reel movable about an upright axis and carrying vertically movable boards or holders from which are suspended the wicks and partly formed candles. The reel is turned by hand by the operator standing at the vat by merely taking hold of it and pushing it around until one of the holders with the wicks depending therefrom is over the vat. The holder is then let down by means of a rope and pulley so that the wicks enter the melted wax in the vat and is then pulled up again, and the rope fastened to hold the holder in elevated position. The reel is then turned until the next holder comes over the vat, and the dipping operation by means of the rope and pulley repeated. Eventually, the first set of wicks which were dipped come around to the vat and they are redipped. These operations are repeated until the candle is built up to the proper size and during the rotation of the reel, the wax on the wicks and partly formed candles hardens preparatory to the next dipping operation. When one set of candles are built up to the proper size, the operator leaves his station and removes them and replaces an additional set of wicks. The operation is comparatively slow. Much time is consumed during the loading and unloading operations as the candle making process stops during these operations. The object of this invention is a machine by which the process is continuous, no time lost by the operator in loading and unloading and preferably, a plurality of dipping taking place at one time with the proper cooling interval between them and also, a proper final cooling between the last dipping and the unloading operation.

This candle making or dipping machine comprises wax containing vats, a plurality of holders for wicks and partly formed candles, dippers arranged over the vats and movable toward and from them to dip the wicks or partly formed candles therein, a conveyor for moving the holders successively to the dippers and power mechanism for intermittently actuating the conveyor to carry the holders successively to the dippers and reciprocating the dippers during each stop period of the conveyor. During each stop period, the holders containing finished candles are removed and the new holder with wicks placed in the machine. By the term "wax" is meant any candle making material, regardless of whether it is wax in the true sense, grease, or stearic acid, or paraffin etc.

Preferably the machine is provided with a series or plurality of vats spaced apart and the wicks and partly formed candles are then brought successively to the vats and dipped a plurality of times during each cycle of movement of the machine, a sufficient interval being left between the two to permit the wax to harden sufficiently before the next dipping operation.

The machine here illustrated is shown as provided with four vats. Some candles require sixteen dippings before completed and in such case, the candles or partly formed candles would require four cycles of operation of the machine. Candles of other sizes will require a less number of cycles.

1 designates the vats for receiving the wax or other candle making material, these being heated in any suitable manner to maintain the wax in molten condition. They are here shown as heated by steam coils 2 located in a jacket around the vat 1. These vats are usually mounted on the floor under the frame of the machine.

The frame of the machine may be of any suitable form, size and construction. 3 designates the frames which support the wick trays, these are usually rectangular frames consisting of a marginal frame of angle iron, the frame being adapted to receive any suitable means from which the candle wicks are suspended. This means being a light rectangular tray 4, consisting of a marginal frame of angle iron with sheet metal holders with V shaped notches 5 into which the wicks 6 are drawn and suspended. 4A being the plan or top view of the sheet metal bars or holders from which the wicks 6 are suspended. 4b being the end view of sheet metal bar as shown in Figures 8 and 9. The frames in the illustrated embodiment of my invention are supported upon or slide along lower and upper tracks 7 and 8 forming part of the frame of the machine, these tracks extending over the vats.

10 designates the dippers which are here shown as located between spaced apart sections of the track and as arranged in alignment with the vats and movable toward and from the vats, the dippers being wide enough to receive one holder or tray. The conveyors move along the tracks and the dippers from one vat to another and are provided with means for interlocking with the holders 3, so that the holders are coupled to the conveyors, the interlocking means being constructed to permit disengagement or uncoupling of the holders from the conveyors when moved in a direction at a right angle to the direction of travel, as when the holders are on the dipper and to permit the reengagement or coupling of the holders with the conveyor when the dipper returns to its starting position. There are upper and lower conveyors alike in construction.

11 designates the lower conveyor and 12 the upper conveyor. Each conveyor is here shown as a belt or sprocket chain, the lower conveyor running over sprocket wheels 13 and 14 at opposite ends of the track 7 and the upper conveyor running over similar sprocket wheels 15 and 16. The upper tracks 8 are continuous or uninterrupted as no dipping operation takes place while the holders are being moved along the upper track.

The interlocking means are here shown as pins or shoulders 20 provided on the chains 11 and 12 at intervals and pins or shoulders 21 provided on the ends of the holders 3. The pins 20 are arranged in sets of three each for a purpose to be presently described. It is obvious that the pin 20 will push against the pins 21 and move the holders along the track, and after the holders have been moved onto the dippers 10, the shoulders 21 at the end of the dipping operation, or after the dippers 10 return to their upper or starting position. As before stated, the dippers 10 practically constitute sections of the track 7, and hence engage the ends of the holders 3 and the dipper 10 on one side of the machine is disconnected from the dipper on the other side of the machine. Each dipper is provided with an upwardly extending bar or stem 22 movable in fixed guides 23 and each of the stems is connected to the actuating mechanism, as will be hereinafter described.

The dippers 10 are provided with means for holding the holders or trays 3 from displacement during the dipping operation and as best seen in Figures 8 and 9, each holder 3 is provided with rollers 24 extending downwardly from the bottom of the angle iron frame thereof and the dippers 10 are provided with a lengthwise slot 25 with which the rollers coact as the holders 3 are brought to the dippers by the conveyor chains 11.

As here shown, the slot in the dippers 10 is formed by the spring pressed member 26 fixed to the under side of said dippers by a bolt and slot construction 27 and bent to form the outside of said slot 25. The springs 28 tend to press said member 26 to close the slot.

29 are the notches with which the rollers 24 coact when the holders have been placed on the dippers in their proper position and said notches 29 in conjunction with the spring pressed member 26 hold the holders or trays from displacement during the dipping operation.

The pins 20 are provided in sets of three because the holders or trays move end to end along the tracks, the shoulder 21 at the advance end of each tray being located between the second and third pins of one set and the shoulder 21 at the rear ends of the trays being located between the first and second pins 20 of the next set of pins.

The holders are transferred from the lower track 7 to the upper track by elevator mechanism here shown as endless belts or sprocket chains 31 movable over sprocket wheels 32, 33 the chain having outwardly extending arms or carriers 34 at intervals located to pick up the holders from the extreme end or rest portion 35 (Figure 3) of the lower track 7 and elevate them to the level of the upper track section into position to be picked up by the shoulders 20 on the upper conveyor chain 12.

The opposite end of the machine is provided with a similar mechanism for receiving the holders from the upper track 8 and lowering them to the level of the lower track into position to be picked up by the conveyor chain 11 and moved along the lower track 7. This mechanism consists of a conveyor chain 41 movable over upper and lower wheels 42, 43 suitably supported by the frame and having outwardly extending arms 44 arranged to be moved successively into alignment with the upper tracks 8 to receive the holders therefrom and to be moved downwardly into alignment with the lower tracks 7 and carry the holder therewith. There is a pair of wheels 32 and 33 on each side of the machine and a chain 31 runs over each pair. Likewise there is a pair of wheels 42, 43 on each side of the machine and over each pair a chain 41 runs.

The conveyors 11 and 12 are intermittently actuated with the dippers 10 and also the elevator chains 31 and 41 are actuated during the stop periods of the conveyor chains 11 and 12. The power mechanism for actuating the conveyors, dippers and elevators comprises a drive shaft, motion transmitting means between the drive shaft and the conveyors and between the drive shaft, the dippers and elevators.

51 designates the drive shaft which is actuated from any suitable prime mover as an electric motor 52. The motion of the motor shaft is transmitted through a reduction gear located in a casing 53 to a shaft 54 arranged in alignment with the shaft 51 and connected thereto by a clutch 55 having a shiftable portion 56 operated by a suitable shift lever 57 to connect and disconnect the drive shaft from the motor.

The motion transmitting means between the shaft 51 and the conveyor chains 7 and 8 comprises a beveled pinion 61 mounted on the shaft 51 and meshing with the beveled gear 62 mounted on the shaft 63 and having a gear 64 thereon, a gear 65 on a stationary shaft 66 supported in the frame and extending transversely thereof, the gear 65 meshing with the gear 64, a sprocket wheel 67 rotatable with the gear 65, a belt or chain 68 running over the sprocket wheel 67 and over a sprocket wheel 69 above the level of the upper tracks 8, a shaft 71 on which the sprocket wheel 69 is mounted and having a gear 72 thereon which meshes with a gear 73 on the shaft 74 and the sprocket wheel 15 over which the upper chain 12 travels, this sprocket wheel 15 being rotatable with the gear 73.

The motion transmitting mechanism further includes a belt or chain 76 running over a sprocket wheel rotatable with the gear 72 and over a sprocket wheel 13ª rotatable with the sprocket wheel 13 over which the lower conveyor chain 11 runs. There is a gear 72 and a sprocket wheel rotatable therewith on each end of the shaft 71, there also being two chains 76 and two sprocket wheels 13ª. It is obvious that while the sprocket wheel 67 is rotating, both conveyor chains 11 and 12 will be actuated. The sprocket wheel 67 is connectable to and disconnectable from the gear 65 by timing mechanism to be hereinafter described so that the conveyor chains 11 and 12 are intermittently actuated.

The dippers 10 are actuated from the shaft 51 during the stop periods of the conveyor chains 11 and 12 and the motion transmitting means between the shaft 51 and the dippers comprises pinion 61 meshing with the beveled gear 72 and mounted on a shaft 73, a spur gear 74 on said shaft and meshing with a spur gear 75 on the opposite end of the stationary shaft 66 to that on which the gear 65 is mounted, a sprocket wheel 77 connectable to and disconnectable from the gear 75 to be intermittently actuated thereby, a belt or chain 78 running over a chain wheel 79 mounted on a shaft 81 at one side of the sprocket wheel 33 for the elevator; a sprocket wheel 82 also mounted on the shaft 81 and rotatable therewith and hence with the sprocket wheel 79, a belt or chain 83 running over the sprocket wheel 82 and over a sprocket wheel 84 mounted on a stud shaft 85 carried by the frame; a chain 86 running over a sprocket wheel 87 on the stud shaft 85 and over a sprocket wheel 88 mounted on a fixed shaft 89 supported by the guide 23 for the dippers, the chain 86 running lengthwise of the guide 23 for the dipper and a connecting rod 91 pivoted at 92 to the chain 86 and at 93 to the stem 22 of the dipper. Thus during the rotation of the sprocket wheel 77, the chain 86 will be actuated and during the actuation thereof, the dipper will be raised and lowered or reciprocated owing to the connecting rod 91. Each dipper 10 is counterbalanced by means of a weight 94 connected to the stem 22 of the dipper by a cable 98. Other dippers are actuated in synchronism by sprocket chains 101 running over sprocket wheels paired with sprocket wheel 84 and rotatable therewith, that is the motion of the sprocket wheel 84 of the dipper 10 nearest the prime mover or motor 52 is connected through suitable motion transmitting means to the other dippers. Each guide 23 for the dipper 10 is carried by a bridge 90 spanning the sections of the track 7.

The elevator chain 31 is actuated at the same time that the dippers are actuated but at a slower speed, through motion transmitting mechanism consisting of a belt or chain 111 running over a small sprocket wheel 110 concentric with the sprocket wheel 33 which rotates about the shaft 81 and over a larger sprocket wheel 112 on a shaft 113 on which the lower sprocket wheel 32 of the elevator is mounted, thus during the rotation of the shaft 81, the smaller sprocket wheel 110 will rotate with the sprocket wheel 82 which forms part of the dipper actuating mechanism and drive the lower sprocket wheel 32 of the elevator and the motion of the lower sprocket wheel 32 is transmitted to the upper sprocket wheel 33 through the chain 31 which carried the elevator arm 34.

The elevator shown in Figure 2 is the same as the elevator shown in Figure 1 except that it lowers instead of elevates the holders and is actuated by a chain 114 running over a chain wheel 115 on a shaft 116 and over a sprocket 117 rotatable with the gear 84 of the last dipper adjacent the elevator mechanism which includes the chain 41. The chain wheel 115 actuates a wheel 118 corresponding to the chain wheel 110 and a chain 119 runs over the chain wheel 118 and over a chain wheel 120 paired with the lower chain wheel 43 drives the wheel 42 through the elevator chain 41. Each of the elevator chains is held from flapping by means of a suitable adjustable brace 124 having means at its ends for embracing one of the runs of the chain 31 or 41, thus during the actuation of the dippers, the elevators will be actuated but at a slower speed.

The timing means for causing the intermittent actuation of the conveyor chains 11 and 12 and the actuation of the dippers and the elevators during the stop periods of the conveyor chains may be of any suitable form, size and construction, and comprises generally mechanism for automatically and alternately clutching the sprocket wheels 67 and 77 to the gear wheels 65 and 75.

This clutching means is the same for each of the wheels 65 and 75 and is best shown in Figure 6 in connection with the wheel 75. Each sprocket wheel 67 or 77 is mounted on a sleeve 131 on the stationary shaft 66 and the wheel 65 or 75 is mounted to rotate idly or loosely about the sleeve. A clutch section 132 is mounted on the sleeve 131 and keyed thereto to rotate therewith. This clutch section has clutch faces on opposite sides thereof and when shifted in one direction clutches the gear 75 to the sleeve 131 at 133 and when shifted in the other direction, clutches the sleeve to a stationary part or to the frame at 134 to stop the sprocket wheel 77. A similar clutch 135 operates in the same manner in regard to the wheel 65.

The two clutches are shifted so that the clutch 135 couples the sprocket wheel 67 to the wheel 65 when the clutch 132 releases the sprocket wheel 77 from the wheel 75 and vice-versa. The operation of the clutches is performed by a rotating cam 140 mounted concentric with the stationary shaft 66 and rotatable about the same and having internal cam grooves 141 and 142 therein about the axis of the shaft 66. Shifter rods 143 and 144 have rollers or followers 145 and 146 coacting with the cam grooves, the shifters having forks 147 and 148 coacting with the clutch sections 135 and 132 respectively. There are a pair of shifter rods 144 for the clutch 132 and another pair of shifter rods 143 for the clutch 135. The cam 141 is provided with a gear wheel 150 meshing with a pinion 151 on the shaft 73. The pinion 61 of the drive shaft rotates the shafts 63 and 73 in opposite directions through the gears 62 and 72. The pinion 151 driving the cam 140 through the gear 150 operates to shift the clutch 135 to the right into position to clutch the sprocket wheel 67 to the gear 65 and thus cause the conveyors 11 and 12 to be actuated and at the same time shifts the clutch section 132 out of engagement with the gear 75 to release the sprocket wheel 77 which drives the dippers and the elevators, and to engage said clutch section 132 and the clutch face on the frame at 134 to positively stop the dippers and the elevators mechanism. Thereafter, during the rotation of a cam, which is being constantly rotated from the shaft 73, the clutch 135 is shifted to release the sprocket wheel 67 which drives the conveyor chains 11, 12 and to shift said clutch section 135 into engagement with the frame to positively stop the conveyors and at the same time shift the clutch section 132 into position to clutch the sprocket wheel 77 which drives the dippers and the elevators to the gear 75. Thus, the work cycles of the machine are accurately timed by the cam 140 with internal cam grooves 141 and 142.

It will be understood that there are sets of the chains wheels and chains on each side of the frame of the machine, that is, there is a duplicate mechanism of the various motion transmitting means shown in Figures 1 and 2 on each side of the machine, leaving the space between them open for the passage of the candles.

The loading station is located at the left end of the machine (Figures 2 and 5) where the operator stands and loads the machine with holders with wicks depending therefrom while the elevators are idle. The machine is started by starting the motor and throwing the clutch 56 by means of the handle 57 (Figure 1) and thereafter the operation of the machine is continuous. The holders are carried along the lower tracks 7 to the dippers successively and dipped and the dipped candle or partly formed candles cool when passing from one dipper to the next. The candles require from four to sixteen or more dippings in accordance with the size desired. The machine is shown as provided with four vats and performing four dipping operations during each complete cycle of movement. After the last of the four dipping operations, the holders are carried successively onto the arms 34 of the elevator, and elevated to the upper tracks 8, where they are conveyed step by step to the loading end of the machine. When they reach the loading end (Figure 2), they are passed onto the arms 34 of the elevator and carried downwardly to the lower tracks, where they may remain until picked up by the lower conveyor chain 11 and again proceed through the dipping operations and continue through these cycles until built up to the proper size, at which time they will be removed through a side unloading device which mechanically unloads and will be further described later and shown on Figures 12 and 13, or if the candles are the desired size, the holders may be removed from the arms 34 and a new holder with wicks therein substituted therefor. As the elevators are idle during the conveying operation, there is ample time to remove and replace the holders.

This machine is particularly advantageous in that the operation is continuous and the production of candles per operator greatly increased, and hence the candles are produced much more economically than by machines and methods heretofore used.

Figure 13:
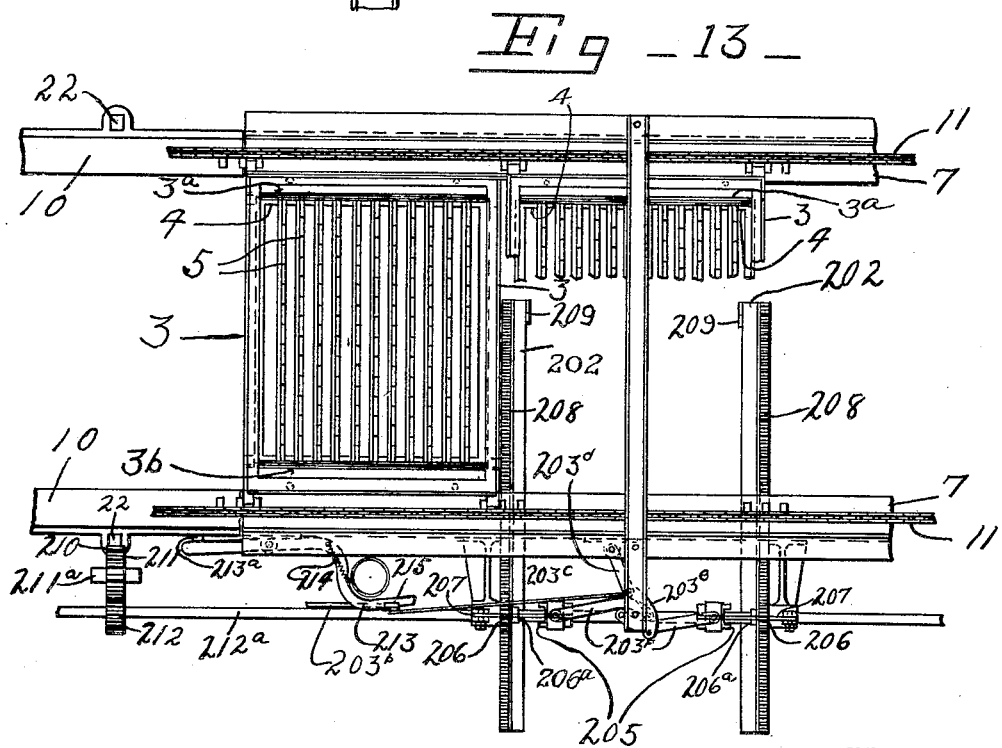
Figure 13 is a fragmentary plan view showing unloader with candle tray.

Wicks trays 4 are supported on two angle irons, 3a and 3b attached to underside of frame 3, Figure 13.

The 2 angle irons 3a and 3b forming a slide onto which tray 4 is placed.

One of these angle irons 3a being supported on each end by a spring 3c which is shown in Figure 9, which allows the angle iron 3a and tray 4 to be pushed back by dog 209 allowing tray 4 down at opposite end to unloader guide 202, which will be described later. Angle iron 3b is attached stationary to frame 3. Figures 12 and 13 show the mechanically operated unloader which is located after each dipper to allow the unloading to be done after any dip when the candles are of the desired size. The unloading is done in the following manner when the tray of candles to be unloaded is of the desired size and approaching the unloader the conveyor being in operation the shifting knob or lever 203 is thrown to the right and upward in an arc bringing it in contact with shifting rod 203a thus shifting lever 203b shifting rod 203c also levers 203d, 203e, 203f, throwing clutches 205 into engagement with clutches 206a which is attached to and part of gear 206, also at the same time throws lock lever 207 out of engagement with gear 206 and allows gear 206 to rotate which in turn moves gear rack 208 to which is attached unloader guide 202 across lower conveyor and engages dog 209 against side of wick tray 4 and angle 3a which is hung on springs 3c. This allows tray 4 to slide off angle 3b and drop to unloader guide 202 which after receiving tray 4 and load moves back across conveyor taking tray 4 and its load of candles out of the conveyor and to the place of rest where it remains until unloaded by operator. Then during next period of conveying shifting knob on lever 203 is thrown to the right and downward in an arc to position as shown in Figure 12 which throws clutches 205 and 206a out of engagement and allows unloader to remain in rest position until next unloading operation is desired, at the same time engaging lock lever 207 in teeth of gear 206. Holding the same in lock position until another operation of the unloader is desired when above operation is repeated.

The transmission of power to the unloading device is obtained in the following manner. There is a gear rack 210 attached to dipper stem 22 which revolves gears 211 on stud 211a and gear 212 on shaft 212a. 211 being an intermittent gear which drives 212 on shaft 212a which is the drive shaft of the unloader to which is also keyed clutches 205 but allows them to shift into and out of engagement with clutches 206a by shifting lever 203.

It will be seen that when dipper stem 22 with gear rack 210 attached moves downward with clutches 205 engaged with clutches 206a attached to gear 206 it will cause gear rack 208 with unloader 202 attached to move across lower conveyor and engage dogs 209 with tray 4 and movable angle iron 3a causing tray 4 to drop down on unloader guide 202 with gear rack 208 attached. When dipper stem 22 with gear rack 210 attached moves in an upward direction with clutches 205 engaged with clutches 206a attached to gear 206 it will cause gear rack 208 with unloader guide 202 attached, to move back across conveyor to rest position. When clutches 205 and 206a will be disengaged by operator throwing shifting lever 203 to the right and downward to the position as shown in Figure 12 where the unloader will remain at rest with its load until unloaded by operator when it is ready for next operation.

213 Figure 12 is a safety lock which locks shifting lever 203 and 203b and complete shifting device for clutches 205 so that when dipper is in operation clutch lever 203 cannot be operated. 213a is a small wedge shaped projection on back of dipper 10 which when dipper is raised to rest position releases lock 213 from engagement with lever 203b, allowing shifting lever 203 to be thrown, shifting clutches 105, immediately on operation of dipper 10 it will be seen that 213a moves out of contact with lock 213 allowing spring 214 to pull lock 213 so as to bring notch 215 on lock 213 into engagement with lever 203b which locks shifting mechanism on clutches 205 so that they cannot be operated while dipper is in operation.

What I claim is:

1. In a candle making machine, the combination of a vat, holders for wicks and partly formed candles, an intermittently movable conveyor for moving the holders successively into a position over the vat, a dipper for receiving the holders and movable toward and from the vat to dip the wicks and partly formed candles therein, and mechanism for intermittently actuating the conveyor to carry the holders toward and from the dipper and reciprocating the dipper during each stop period of the conveyor.

2. In a candle making machine, the combination of a vat, a plurality of holders for wicks and partly formed candles, a dipper located over the vat and movable toward and from the same, an intermittently movable conveyor coacting with the holders and operable to move them successively to the dipper and away from the dipper, and means for actuating the conveyor, and the dipper during the stop periods of the conveyor.

3. In a candle making machine, the combination of a plurality of vats, a plurality of holders for wicks and partly formed candles, a dipper movable toward and from each vat, an intermittently movable conveyor coacting with the holders and movable to carry the holders successively to the dippers, and mechanism for intermittently actuating the conveyor, and the dippers during the stop periods of the conveyor.

4. In a candle dipping machine, the combination of a vat, a holder for wicks and partly formed candles, a dipper movable towards and from the vat, an intermittently movable conveyor having means coacting with the holder to move the same to and from the dipper, an actuator, motion transmitting means between the actuator and the conveyor and between the actuator and the dipper to operate the dipper during the stop periods of the conveyor.

5. In a candle dipping machine, the combination of a vat, a holder for wicks and partly formed candles, a dipper movable toward and from the vat, an intermittently movable conveyor having means coacting with the holder to move the same to and from the dipper, an actuator, motion transmitting means between the actuator and the conveyor and between the actuator and the dipper to operate the dipper during the stop periods of the conveyor, and a timer for controlling the actuation of said motion transmitting means by the actuator.

6. In a candle dipping machine, the combination of spaced apart vats, a plurality of holders for wicks and partly formed candles, and means for conveying the holders successively into a position over the vats and moving the holders toward and from the vats.

7. In a candle making machine, the combination of a vat, tracks extending over the vat, a holder for wicks and partly formed candles movable along the tracks, the tracks including spaced apart sections, a dipper movable toward and from the vat, a conveyor movable along the track and normally bridging the track sections and having means normally interlocking with the holders, whereby the holders are moved along the tracks by the conveyors to and from the dipper, and means for intermittently actuating the conveyor and actuating the dipper during the stop periods of the conveyor.

8. In a candle dipping machine, the combination of a plurality of spaced apart vats, a track extending above the vats crosswise thereof, holders for wicks and partly formed candles movable along the tracks successively to positions over the vats, the tracks having spaced apart sections with the spaces between the sections over the vats providing dippers bridging said spaces and movable toward and from the vats, a conveyor movable along the tracks, and having means for interlocking with the holders, whereby the holders are moved along the track to the dippers, said interlocking means being disengageable upon a vertical movement of the holders, and means for intermittently actuating the conveyor, and the dippers during the stop periods of the conveyor.

9. In a candle making machine, the combination of a vat, holders for wicks and partly formed candles, a dipper arranged over the vat and movable toward and from the same, a conveyor for moving the holders successively to and from the dippers, the conveyor including upper and lower runs and an elevator at the ends of the runs for carrying the holders from one run to the other, and means for intermittently actuating the upper and lower runs and actuating the dipper and the elevators during the stop periods of the conveyor.

10. In a candle dipping machine, the combination of a vat, a frame extending over the vat and having a loading and unloading station at one end or at any stop position along the lower conveyor while unloading will generally be done at an unloader after each dipper, holders for wicks and partly formed candles, a dipper arranged over the vat and movable toward and from the same, a conveyor comprising upper and lower runs, the conveyor and the holders having coacting means whereby the holders are moved by the conveyors to and from the dipper, mechanism for actuating the lower run of the conveyor to carry the holders successively from said station to and from the dipper, and the upper run operating to carry the holders back to said station, and power mechanism for intermittently actuating the conveyor and the dipper during the stop periods of the conveyor.

11. In a candle dipping machine, having a plurality of spaced apart dipping stations, a frame extending above said stations and having a loading and unloading station at one end, a plurality of spaced apart mechanically operated stations, a plurality of holders movable along the frame from the loading and unloading stations successively to the dipping stations, and back to the loading and unloading stations, dippers carried by the frame and arranged above the dipping stations and movable toward and from the same, a conveyor movable along the frame for moving the holders successively to the dippers from the loading and unloading station and returning them to the loading and unloading station, and power mechanism for intermittently actuating the conveyor and the dippers during the stop periods of the conveyors.

12. In a candle dipping machine a frame, an intermittently operated dipper, an intermittently operated conveyor, a mechanically operated unloader operating in conjunction with the dipper. The motion transmitting mechanism for the unloader includes a gear rack attached to dipper stem, an intermittent gear which drives a gear on drive shaft which clutches to gear in unloader and operates unloader through means of gear rack attached to unloader.

13. In a candle dipping machine, a vat, a conveyor for carrying the candles into and out of position over the vat, a mechanically operated unloading station, a reciprocally movable dipper, and power means including motion transmitting mechanism for intermittently actuating the conveyor and reciprocating the dipper during the stop periods of the conveyor, the motion transmitting mechanism for the dipper including a belt and wheels over which the belt runs, a connecting rod pivoted at one end to the belt, and at its other end to the dipper.

14. In a candle dipping machine, a frame, a mechanically operated unloader, an intermittently operated conveyor, and an intermittently operated dipper, actuating means for the conveyer, dipper and unloader comprising a constantly movable prime mover, motion transmitting mechanism between the driver and the conveyor, motion transmitting mechanism between the driver and the dipper, and a timer between the prime mover and said motion transmitting means for timing the intermittent operations thereof and the actuation of the dipper during the stop periods of the conveyor.

15. In a candle dipping machine, a frame, a mechanically operated unloader, an intermittently operated conveyor and an intermittently operated dipper, actuating means for the conveyor and unloader comprising a constantly movable prime-mover, motion transmitting mechanism between the prime mover and the conveyor, motion transmitting mechanism between the prime mover and the dipper, a timer between the prime mover and said motion transmitting mechanisms for timing the intermittent operations thereof and the actuation of the dipper during the stop periods of the conveyor, said timer comprising a cam operable by the prime mover, clutches operable to connect and disconnect said motion transmitting mechanisms, one of each mechanism and followers coacting with the cam and connected to said clutches.

16. In a candle dipping machine, a frame, a mechanically operated unloader and intermittently operated conveyor, and an intermittently operated dipper, actuating means for the conveyor, dipper and unloader comprising a constantly movable prime mover, motion transmitting mechanism between the prime mover and the conveyor, motion transmitting mechanism between the prime mover and the dipper, a timer between the prime mover and said motion transmitting mechanisms for timing the intermittent operations thereof and the actuation of the dipper during the stop periods of the conveyor, said timer comprising a cam operable by the prime mover, clutches operable to connect and disconnect said motion transmitting mechanisms respectively, one of each mechanism and rotatable with connections, followers coacting with the cam and connected to said clutches, and means fixed to the frame of the machine for coacting with the respective clutches when they are shifted out of motion transmitting position for stopping the same and the motion transmitting mechanism connected thereto.

17. In a candle dipping machine, a frame, a mechanically operated unloader, an intermittently operated conveyor, and an intermittently operated dipper, actuating means for the conveyor, the dipper and unloader comprising a constantly movable prime mover, motion transmitting mechanism between the prime mover and the conveyor, motion transmitting mechanism between the prime mover and the dipper, and a timer between the prime mover and said motion transmitting mechanisms comprising a stationary shaft, rotatable motion transmitting members mounted to rotate about the shaft and forming part of the motion transmitting mechanism between the prime mover and the conveyor and between the prime mover and the dipper respectively, clutches for connecting said members to the prime mover, a cam rotatable by the prime mover and mounted to rotate about said shaft, and followers coacting with the cam and connected respectively to the clutches.

18. In a candle dipping machine, a frame, a mechanically operated unloader, an intermittently operated conveyor, and an intermittently operated dipper, actuating means for the conveyor, dipper and unloader comprising a constantly movable prime mover, motion transmitting mechanism between the prime mover and the conveyor, motion transmitting mechanism between the prime mover and the dipper, and a timer between the prime mover and said motion transmitting mechanisms, means comprising a stationary shaft, rotatable motion transmitting members mounted to rotate about the shaft and forming part of the motion transmitting mechanism between the prime mover and the conveyor and between the prime mover and the dipper respectively, clutches for connecting said members to the prime mover, the clutches being rotatable with said members, a cam rotatable with the prime mover and mounted to rotate about said shaft, followers coacting with the cam and connected respectively to the clutches, and means fixed from rotation with the clutches for coacting therewith when shifted out of motion transmitting position to stop the same and the mechanisms connected thereto.

In testimony whereof, I have hereunto signed my name, at Syracuse, in the county of Onondaga, and State of New York, this 1st day of June, 1932.

EDWARD C. BIXBY.